United States Patent [19]
Johnson

[11] 4,077,274
[45] Mar. 7, 1978

[54] WORM WHEEL

[75] Inventor: William J. Johnson, Norwell, Mass.

[73] Assignee: Boston Gear Inc., Quincy, Mass.

[21] Appl. No.: 612,161

[22] Filed: Sep. 10, 1975

[51] Int. Cl.² ............... F16H 1/16; F16H 1/20; F16H 55/12; F16H 55/30
[52] U.S. Cl. .................. 74/425; 74/243 DR; 74/446; 74/447
[58] Field of Search .......... 74/447, 446, 425, 243 DR

[56] References Cited
U.S. PATENT DOCUMENTS
3,461,738   8/1969   Pandjiris et al. .................. 74/425 X Primary Examiner—Leonard H. Gerin
Attorney, Agent, or Firm—James C. Wray

[57] ABSTRACT

An improved worm wheel which is capable of mating with a worm includes a base portion and a wear portion. The wear portion loosely encircles the base portion with mating teeth therebetween, there being a greater number at the interior of the wear portion than at the exterior of the base portion. The wear portion also includes an array of teeth at its outer surface for engaging the worm.

7 Claims, 4 Drawing Figures

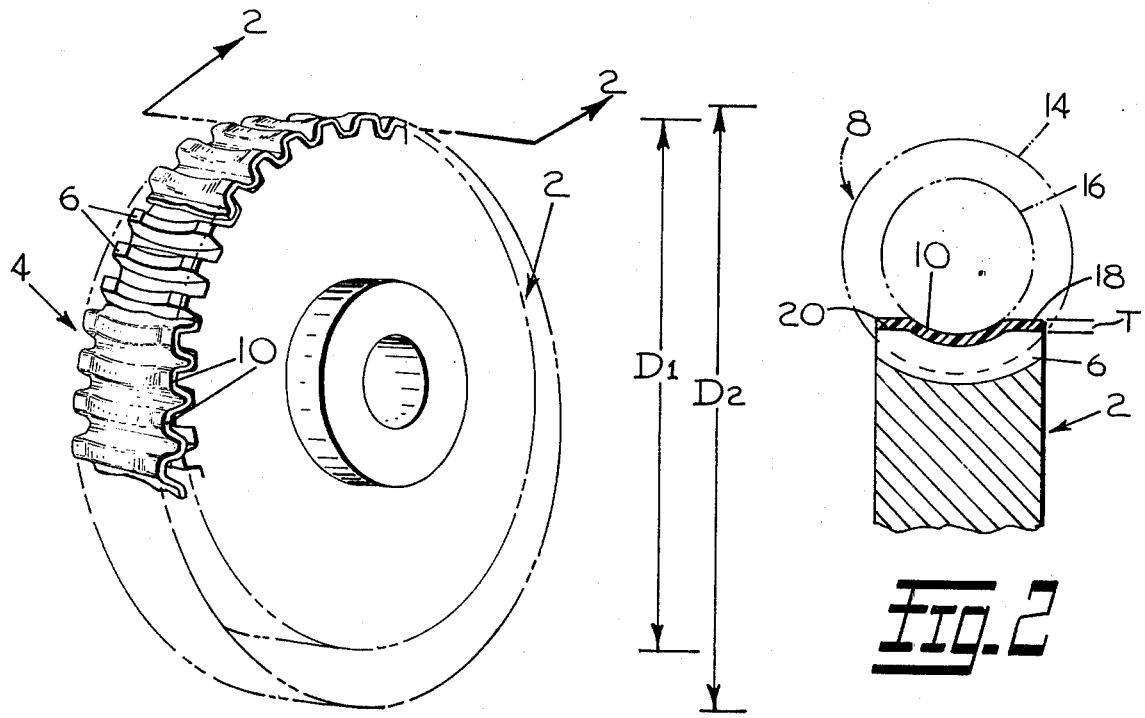
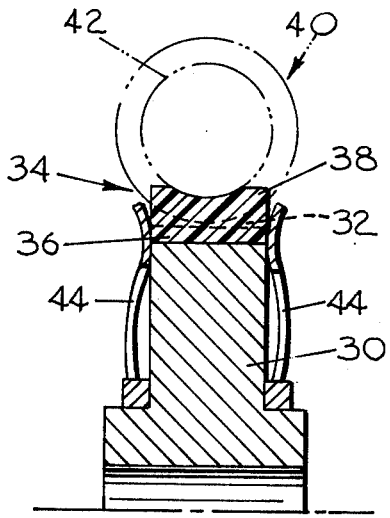
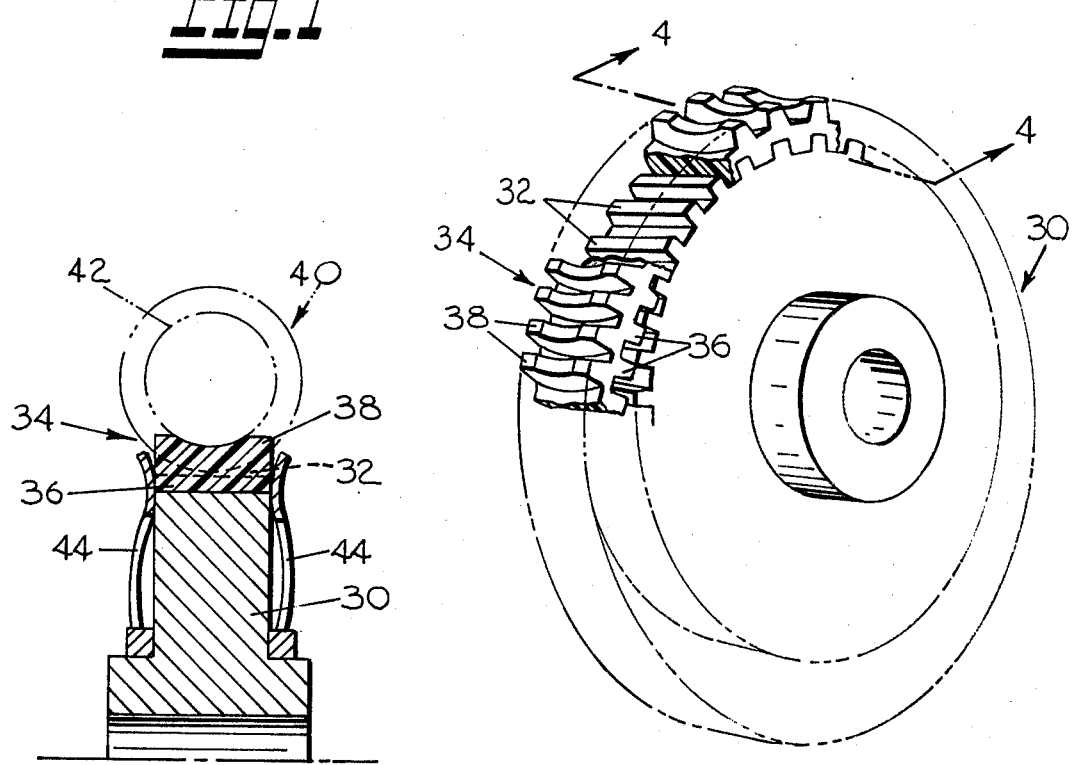

WORM WHEEL

BACKGROUND OF THE INVENTION

1. Field of the Invention

This Invention relates to a worm gear and, more specifically, to an improved worm wheel having a removable wear member mounted thereon between the wheel and the worm.

2. Description of the Prior Art

In a worm gear including a worm and worm wheel it has been found desirable to provide a self-lubricating surface such as plastic or polytetrafluoroethylene. However, in many instances, a worm or wheel made entirely of this substance would not satisfy the operational strength requirements.

Further, it has generally been a problem when selecting a base material of the worm or wheel that any significant wear would require the entire member to be replaced in order to provide continued effective operation.

Accordingly, it has been taught in the past that an outer surface portion of a power drive member might be removably secured thereto for subsequent replacement of just the outer portion after excessive wear. U.S. Pat. Nos. 519,781 and 601,990 and early patents regarding sprocket wheels disclose this general concept. They present, however, relatively complicated means for securing the outer portion to the base power drive member preventing them from being applicable in many cases.

More recent efforts, such as those disclosed in U.S. Pat. Nos. 2,923,166 and 3,059,491 recognize the desirability of using two different materials within the power drive member and also in providing a means for replacing only the outer portion when it becomes extensively altered by wear. U.S. Pat. No. 3,059,491 further teaches that it is desirable for the wear to occur at the outer portion to prevent wear and subsequent replacement of the power drive member and the mating power transfer member which are generally more expensive to replace.

However, nothing is taught in nor suggested by these prior art devices to indicate that this wear concept can be utilized in a worm gear. The wear portions disclosed therein are either tightly fitted about the power drive member or complicatedly attached thereto.

SUMMARY OF THE INVENTION

It is therefore an object of the present invention to provide a worm wheel of a strong base material having a removable surface portion thereon which is capable of mating with the worm.

It is another object of the present invention to provide a worm wheel of the type described in which the removable surface portion is inexpensive to manufacture and simple to install.

To accomplish these and other objects of the invention, a preferred embodiment thereof is in the form of a worm wheel which includes a base portion made of a strength material to include a plurality of external teeth. A wear portion of the gear member is made of a resiliently deformable, generally noncompressible material. The wear portion loosely encircles the base portion and includes an internal array of interim teeth to partially mate with the external teeth. There are a greater number of internal teeth than external teeth. The outer surface of the wear portion includes mating teeth for engagement with a worm.

BRIEF DESCRIPTION OF THE DRAWINGS

FIG. 1 is a fragmented perspective view of the preferred embodiment including various features of the preferred worm wheel.

FIG. 2 is a view of the embodiment shown in FIG. 1 as seen along line 2—2.

FIG. 3 is a fragmented perspective view of an alternative embodiment of the present invention.

FIG. 4 is a view of the embodiment shown in FIG. 3 as seen along line 4—4 and further includes a retaining portion of the present invention.

DETAILED DESCRIPTION OF THE PREFERRED EMBODIMENTS

As shown in FIGS. 1 and 2, a worm wheel 2 of the present invention has a wear ring 4 positioned thereon to extend about its periphery. The worm wheel 2 may be made of any suitable strength material while the wear ring 4 is preferably formed of some material, such as polytetrafluoroethylene or plastic which is resiliently deformable but generally not compressible. The wear ring 4 may be either molded or produced by some extrusion process. The teeth 6 of the worm wheel 2 are generally shaped to mate with a worm 8 but are nevertheless cut undersized as will be explained hereinbelow. The contact teeth 10 of the wear ring 4 are specifically dimensioned to mate with the worm 8. Consequently, the actual size of the teeth 6 and the diameter D1 of the worm wheel 2 are predetermined by the thickness T of the wear ring 4.

As best seen in FIG. 2, the worm 8 has an outside diameter 14 and an inside diameter 16 and mates with the wear ring 4 so that any force generated by the worm 8 or the worm wheel 2 is transmitted to the other by the wear ring 4. It can be seen that the general wear portion taught in the prior art by, for example, U.S. Pat. No. 3,059,491, would not be applicable for a worm wheel. A tightly fitted wear portion could not be readily mounted on a worm wheel because the radial distances to the worm are different at different axial locations on the surface of the worm wheel.

Accordingly, to enable the wear ring 4 to be installed upon the worm wheel 2, the diameter D1 of the worm wheel 2 is significantly less than the diameter D2 of the wear ring 4. To enable the contact teeth 10 of the wear ring 4 to nevertheless mate with the worm 8 despite this difference in diameters, there are more contact teeth 10 for the wear ring 4 than there are teeth 6 for the worm wheel 2. It would initially appear that a loosely fitted wear ring 4 would not be retained on the worm wheel 2 during operation. However, as best seen in FIG. 2, the overlapping edges 18 of the wear ring 4 make contact with the surfaces 20 of the worm wheel 2 which are not intended to mate with the worm 8. Rotation of the worm 8 will act on the wear ring 4 with the tendency to cause the wear ring 4 to move axially with respect to the worm wheel 2. However, after initial installation, the wear ring 4 is tightly received between the worm wheel 2 and the worm 8 and the overlapping edges 18 and the surfaces 20 prevent any axial movement which would tend to dislocate the wear ring 4.

As seen in FIGS. 3 and 4, an alternative embodiment of the invention includes a base worm wheel 30 which is actually shaped in the form of a helical gear. The teeth 32 of the wheel 30 are significantly easier to manufacture than those described hereinabove. An alternative wear ring 34 is therefore provided which has inside teeth 36 to mate with the teeth 32 of the worm wheel 30 and outside teeth 38 to mate with a worm 40 in a manner similar to the embodiment described hereinabove. The wear ring 34, although significantly thicker than the wear ring 4, still serves the same function of transmitting forces between the wheel 30 and the worm 40.

Although the difference in the diameters of the worm wheel 30 and the wear ring 34 is not as obviously required as had been the case for wear ring 4 described hereinabove, it nevertheless allows for easy installation and removal. While the inside teeth 36 of the wear ring 34 again mate with the teeth 32 of the worm wheel 30, the different diameters again require that there be more inside teeth 36 than teeth 32.

Since the wheel 30 is now in the form of a helical gear, it is not as immediately apparent that the wear ring 34 will be retained thereon throughout operation. Although, as seen in FIG. 4, the general entrapment of the wear ring 34 against the inside diameter 42 of the worm 40 will tend to prevent its axial movement with respect to the wheel 30, a pair of retaining plates 44 may be added to the sides of the worm wheel 30 to insure its retention. The retaining plates 44 may be formed of sheet metal or plastic since they would not be expected to be subjected to any significant amount of force. While the first embodiment of FIGS. 1 and 2 includes a wear ring 4 which can readily transmit higher forces because there is some extension of the teeth 6 of the worm wheel 2 into the worm 8, the embodiment of FIGS. 3 and 4 might be more appropriate if the higher forces are not required. Use of a thicker wear ring 34 enables one to use a different number of outside teeth 38 than inside teeth 36 if desired.

The improved worm wheel and wear ring configuration of the present invention has several advantages not heretofore shown by the prior art. The wear ring, by loosely encircling the wheel, can be easily installed and removed when required. Additionally, because of the different number of mating teeth of the wheel and the wear ring, the wear ring will tend to "walk" around the wheel during operation. This feature results in a continuing change in the relative location of the wear ring with respect to the worm and wheel. It would therefore by possible for the manufacturing tolerances of the wheel and worm to be less rigid than would be required if direct contact therebetween was required. Any imperfection in the wheel or the worm with a tightly fitting wear ring of the prior art would act repeatedly on the same location of the wear ring to cause uneven wear which might shorten its effective life. However, the "walking" effect of the wear ring of the present invention would tend to spread the wear to other locations about its surface. A further feature to be considered with the loosely fitting wear ring is the possibility with wheels and worms which are continuously operated in one direction of simply turning the wear ring around if wear thereof becomes excessive on one side of the teeth. Since, as shown in FIG. 4, a means is provided for insuring retention of a loosely fitted wear ring against axial movement, it might be possible to utilize the general configuration taught hereinabove with other types of gear than simply a worm gear.

Obviously, the present invention is not limited to the specific details as herein described, but is capable of other modifications and changes without departing from the spirit and scope of the appended claims.

I claim:

1. An improved gear member of the type which is capable of engaging a second gear member, wherein said improvement comprises:

a base portion of said gear member which is made of a strength material and includes a plurality of external teeth;

a wear portion of said gear member which is made of a resiliently deformable, generally noncompressible material and loosely encircles said base portion as an internal array of interior teeth of said wear portion partially mate with said plurality of teeth of said base portion;

said internal array including a number of said interior teeth which is greater than said plurality of external teeth of said base portion;

said wear portion including about its outer surface mating teeth for engagement with said second gear member.

2. The improved gear member as set forth in claim 1, wherein said number of said interior teeth is equal to the number of said mating teeth.

3. The improved gear member as set forth in claim 1, wherein said gear member is a worm wheel, said second gear member is a worm, and said external teeth are inwardly curved to generally mate with said worm to axially retain said wear portion between said worm wheel and said worm.

4. The improved gear member as set forth in claim 1, further including means for retaining said wear portion against axial movement relative to said base portion when said gear member is aligned for engagement with said second gear member.

5. The improved gear member as set forth in claim 1, wherein said gear member and said second gear member are respectively a wheel and a worm of a worm gear and said base portion is a helical gear.

6. The improved gear member as set forth in claim 1, wherein said resiliently deformable, generally noncompressible material is plastic.

7. The improved gear member as set forth in claim 1, wherein said resiliently deformable, generally noncompressible material is polytetrafluoroethylene.

* * * * *